United States Patent
Langer et al.

(10) Patent No.: US 9,801,112 B2
(45) Date of Patent: Oct. 24, 2017

(54) WIRELESS VIDEO LINK OPTIMIZATION USING VIDEO-RELATED METRICS

(71) Applicant: EchoStar Technologies L.L.C., Englewood, CO (US)

(72) Inventors: Paul Langer, Westminster, CO (US); Christopher Bruhn, Aurora, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 184 days.

(21) Appl. No.: 14/676,948

(22) Filed: Apr. 2, 2015

(65) Prior Publication Data

US 2016/0295486 A1 Oct. 6, 2016

(51) Int. Cl.
| | |
|---|---|
| *H04W 4/00* | (2009.01) |
| *H04W 36/30* | (2009.01) |
| *H04L 29/06* | (2006.01) |
| *H04W 36/06* | (2009.01) |

(52) U.S. Cl.
CPC ........... *H04W 36/30* (2013.01); *H04L 65/601* (2013.01); *H04W 36/06* (2013.01)

(58) Field of Classification Search
CPC ...... H04W 36/30; H04W 36/06; H04L 65/601
See application file for complete search history.

(56) References Cited

U.S. PATENT DOCUMENTS

| | | | | |
|---|---|---|---|---|
| 8,966,001 | B2 * | 2/2015 | Rauber | G06Q 30/02 709/212 |
| 2015/0121413 | A1 * | 4/2015 | Ramakrishnan | H04N 21/454 725/25 |
| 2015/0319497 | A1 * | 11/2015 | Rao | H04N 21/4402 725/28 |
| 2016/0261657 | A1 * | 9/2016 | Bruhn | H04L 65/4069 |
| 2016/0295486 | A1 * | 10/2016 | Langer | H04W 36/30 |

* cited by examiner

*Primary Examiner* — Robert Wilson
(74) *Attorney, Agent, or Firm* — Bejin Bieneman PLC

(57) ABSTRACT

A system includes a media content processing device programmed to wirelessly communicate with an access point over a plurality of wireless communication channels. The communication channels include a first communication channel and a second communication channel. The media content processing device is programmed to receive a media content signal from the access point over the first communication channel, process the media content signal, and generate an authorization signal for the access point to transmit the media content signal over the second communication channel in response to detecting issues with the media content signal.

20 Claims, 3 Drawing Sheets

WIRELESS VIDEO LINK OPTIMIZATION USING VIDEO-RELATED METRICS

BACKGROUND

Wireless network devices are ubiquitous in many homes. Such devices include mobile phones, tablet computers, printers, laptop computers, gaming consoles, digital video players, set top boxes, home security systems, wireless speakers, or the like. Wireless devices sometimes share communication channels within a certain frequency spectrum.

DETAILED DESCRIPTION

Wireless communication channels are susceptible to interference and congestion. Interference can significantly affect the quality of the signals transmitted, especially in the context of streaming media content. Symptoms of a low quality media content stream can include pixelated images, disjointed audio or video output, dropped audio signals or video frames, and other audio and video glitches. Trying to consume media content under such conditions can be frustrating.

One way to reduce interference is to stream media content over less congested communication channels. Access points may scan multiple communication channels for signal quality and jump to the channel that has the least interference or congestion. However, the act of jumping to a new channel can create the media content glitches that jumping to a less crowded channel is intended to avoid. Therefore, instead of always jumping to a less congested channel, the access point may wait until it is actually necessary. That is, the access point may wait to jump channels until the media content stream has actually been negatively affected by the congestion on the communication channel. For example, a media content processing device in wireless communication with the access point may receive the media content signal from the access point over a first communication channel, process the media content signal, and generate an authorization signal for the access point to transmit the media content signal over the second communication channel if, e.g., the media content signal is affected by channel congestion and/or interference.

The elements shown may take many different forms and include multiple and/or alternate components and facilities. The example components illustrated are not intended to be limiting. Indeed, additional or alternative components and/or implementations may be used.

Figure 1:
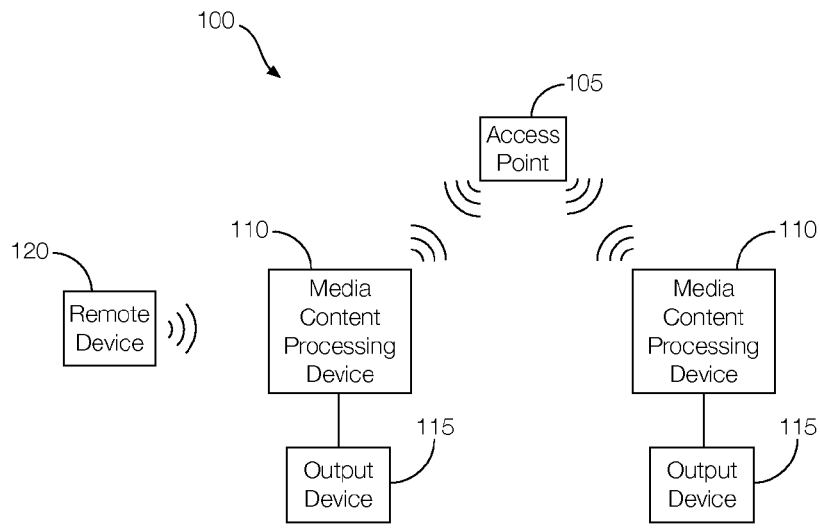
FIG. 1 illustrates an example system for optimizing a wireless communication link among an access point and media content processing devices.

As illustrated in FIG. 1, an example system 100 includes an access point 105 in communication with multiple media content processing devices 110.

The access point 105 may include a computing device configured or programmed to wirelessly communicate over a communication network. The access point 105 may be configured or programmed to transmit wireless signals in accordance with any number of wireless communication protocols. Examples of wireless communication protocols may include, e.g., WiFi, Bluetooth®, Z-wave, Zigbee®, or any other radio frequency-based protocol.

The access point 105 may be programmed to wirelessly communicate over multiple channels. For example, the access point 105 may be programmed to receive a media content signal from a media content provider and wirelessly transmit the media content signal over one or more communication channels. The access point 105 may be programmed to scan the available channels and select one channel based on, e.g., the amount of traffic on each channel, the amount of interference or noise on each channel, etc. The access point 105 may scan channels periodically or in response to a signal, such as an authorization signal, received from one or more of the media content processing devices 110. The access point 105 may be programmed to wirelessly transmit the media content signal to one or more media content processing devices 110 over the selected channel. In some instances, the access point 105 may be programmed to transmit different media content signals to different media content processing device 110 over the selected channel.

If the access point 105 detects excess interference on one communication channel, the access point 105 may be programmed to select a new communication channel for wirelessly transmitting the media content signal. The new communication channel may be determined by scanning and analyzing other communication channels that are available. For instance, the access point 105 may select the communication channel with the least amount of traffic, interference, or noise as the new communication channel. Before it switches to the new channel, the access point 105 may be programmed to wait for authorization from one or more of the media content processing devices 110. Switching channels may disrupt playback of the media content more than the congestion, interference, or noise on the current channel. By waiting for authorization from at least one media content processing device 110, the access point 105 may only switch communication channels when necessary or when playback of the media content is least likely to be significantly interrupted.

The media content processing devices 110 may each include a computing device programmed to receive and process media content signals from the access point 105. The media content processing device 110 may be configured to wirelessly receive the media content signals transmitted over a wireless communication channel. The media content processing devices 110 may each be programmed to process received media content signals so that the media content represented by the media content signal may be presented to a user on, e.g., an output device 115 such as a television, computer monitor, tablet computer, wireless speakers, or the like.

In some instances, the media content processing device 110 may be programmed to detect errors in the media content signal. The errors may indicate a drop in signal quality between the media content processing device 110 and the access point 105. Such errors, therefore, may indicate that the communication channel has become too congested with traffic or is experiencing an unacceptable amount of interference or noise. Some errors can be corrected through error correction processes or by using a buffer as discussed in greater detail below. Errors that cannot be corrected may be severe enough for a user to notice. For example, severe errors may cause glitches such as pixelated images, disjointed audio or video output, dropped audio signals or video frames, or the like.

If signal error is detected, or if the media content processing device 110 determines that a glitch is likely to occur in the near future, e.g., within the next few seconds or minutes, the media content processing device 110 may be programmed to generate an authorization signal permitting or requesting the access point 105 to change communication channels. The media content processing device 110 may be programmed to generate the authorization signal in response to a change in a characteristic of the media content signal. The characteristic may be associated with, e.g., a quality of the media content signal including flow rate, jitter, error rate, latency, and communication channel quality. Alternatively, as discussed in greater detail below, the authorization signal may be generated based on a buffer capacity exceeding a predetermined level or in response to decoding errors. Thus, the authorization signal may be generated in response to the buffer capacity or other metric associated with a particular media content processing device 110 reaching a critical threshold. Moreover, the authorization signal may be generated in response to a user input. For example, a user input indicating a low quality signal may be received at the media content processing device 110 via, e.g., a wireless signal transmitted from a remote device 120, such as a remote control. In one possible implementation, the user input may indicate that there are glitches in the media content playback. Alternatively, a user input that, e.g., repeatedly pauses the playback of the media content may suggest glitches in the media content playback.

In instances where playback of the media content has not yet been affected by signal errors, at least not in a way that's perceivable to a user, the media content processing device 110 may delay the generation of the authorization signal until an event that will independently disrupt playback of the media content. An example event may include a user input changing the channel, a user input pausing playback of the media content, or a user input that "hides" the playback of the media content (e.g., the user input navigates to an area of an interactive guide that does not show media content). The media content processing device 110 may be programmed to detect such events and generate the authorization signal, even if the playback of the media content has so far been unaffected by the signal errors.

Further, where multiple media content processing devices 110 are in communication with a single access point 105 and communicating over a single communication channel, the access point 105 may be programmed to switch to a new communication channel if e.g., a majority (i.e., 50% or more) of the media content processing devices 110 or the media content processing devices 110 with the highest priority transmit authorization signals authorizing the access point 105 to communicate over a different channel. Alternatively or in addition, when multiple media content processing devices 110 are involved, the access point 105 may be programmed to switch to a new communication channel if the playback of media content on other media content processing devices 110 will not be significantly adversely affected, especially if fewer than a majority of the media content processing devices 110 have transmitted an authorization signal to the access point 105. The access point 105, therefore, may be programmed to analyze how the switch to a new communication channel may affect the playback of media content on each of the media content processing devices 110, or at least those that are currently receiving streamed media content signals from the access point 105. This analysis may be based on historical data stored on the access point 105, the media content processing device 110, or a remote server.

In some possible approaches, the access point 105 may receive feedback on the playback of the media content from other networked devices. For example, networked devices programmed to capture video or audio may be further programmed to process the video or audio output by the media content processing device 110 and notify the access point 105 of any glitches that are identified. Examples of such networked devices may include security cameras, smart glasses, mobile phones, tablet computers, digital cameras, microphones, gaming consoles, or the like.

Figure 2:
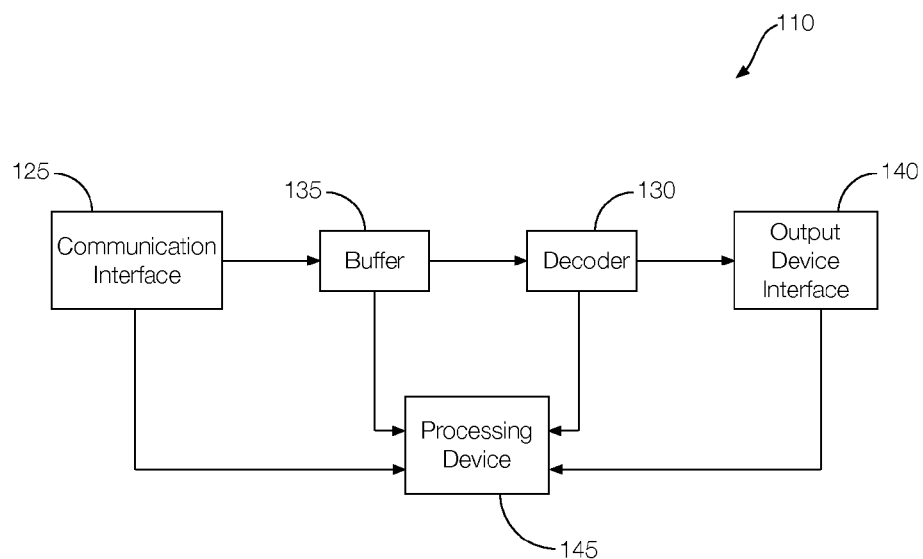
FIG. 2 is a block diagram of example components of a media content processing device.

FIG. 2 is a block diagram showing example components of the media content processing devices 110. As shown, each of the media content processing devices 110 includes a communication interface 125, a decoder 130, a buffer 135, an output device interface 140, and a processing device 145.

The communication interface 125 may include any electronic device configured or programmed to receive media content signals. The communication interface 125 may be configured for wired or wireless communication. For example, the communication interface 125 may be configured to receive media content signals transmitted wirelessly from the access point 105. The communication interface 125 may be configured or programmed to comply with any number of communication protocols including, e.g., Bluetooth® or WiFi. The communication interface 125 may receive the media content signal and transmit the media content signal to, e.g., the decoder 130 or another component of the media content processing device 110. The communication interface 125 may be further configured or programmed to receive or transmit signals on any number of communication channels.

The decoder 130 may include any electronic device configured or programmed to decode the media content signal. Media content signals may be encoded by a content provider and prior to being transmitted from the content provider to the access point 105. The access point 105 may transmit the encoded media signal to the media content processing device 110, and the decoder 130 may decode the encoded media content signal. Decoding the media content signal may allow the media content to be viewed on an output device 115 such as, e.g., a television or other display. In some instances, the decoder 130 may be configured or programmed to perform an error correction or error concealment process (e.g., repeating the last frame of the video and not displaying a new frame with errors) process to the media content signal. The error correction process may mitigate errors in the media content signal caused by wirelessly transmitting the media content signal to the media content processing device 110.

The buffer 135 may include any electronic device configured or programmed to temporarily store the media content signal either before or after the media content signal is decoded. For instance, the buffer 135 may include a physical data memory storage to store the media content signal after the media content signal is received via the communication interface 125 and before the media content signal is output to an output device 115 for presentation to a user. In some possible implementations, the buffer 135 may be configured to store a limited amount of data. The amount of storage space available in the buffer 135 may be referred to as the buffer capacity. Thus, as more and more data is stored in the buffer 135, the buffer capacity may be reduced. Buffer capacity, therefore, increases as the data stored in the buffer 135 is accessed and processed by the decoder 130.

Before the video signal is decoded, video data may be stored in the buffer 135. The buffer 135 may receive video data faster than the decoder 130 can decode the video signal. Therefore, video data may be accessed and processed by the decoder 130 even if the bandwidth temporarily dips. The buffer 135 may be refilled with video data once the bandwidth has returned to a sufficient capacity. The amount of buffered video data, stored in the buffer 135, dropping below a particular threshold may indicate the need to change communication channels, as discussed in greater detail below.

The output device interface 140 may include any electronic device configured or programmed to output the decoded media content signal to an output device 115 such as a television or other display. The output device interface 140 may be configured to output the media content signal in accordance with any number of protocols including, e.g., HDMI, DVI, S-Video, Component Video, Composite Video, or the like. In one possible implementation, the output device interface 140 may be programmed to access the media content signal from the buffer 135 according to a first in, first out (FIFO) methodology. Alternatively, the media content signal may be transmitted to the output device interface 140 by, e.g., the decoder 130 or the processing device 145.

The processing device 145 may include any computing device programmed to determine whether to generate the authorization signal to permit the access point 105 to switch communication channels. The processing device 145 may process the media content signal and determine whether there has been a change in a characteristic, such as a quality, of the media content signal. Example qualities may include a low flow rate, excess jitter, error rate, increased latency, etc. The processing device 145 may be programmed to generate the authorization signal in response to detecting such qualities in the media content signal.

The processing device 145 may be programmed to generate the authorization signal under different circumstances as well. For example, the processing device 145 may be programmed to monitor the buffer capacity. The processing device 145 may generate the authorization signal if the buffer capacity exceeds a predetermined level, indicating that the buffer 135 is almost empty, which may occur if bandwidth drops and the decoder 130 can process the video signal faster than the buffer 135 can receive and store video data. Moreover, a near-empty buffer 135 may indicate a media content signal with more errors than usual. The processing device 145 may be further programmed to monitor the error correction provided by the decoder 130. The processing device 145 may generate the authorization signal if the decoder 130 is frequently performing error correction techniques on the media content signal to address various decoding errors since some decoding errors can be attributed to a poor communication channel. Another approach may include the processing device 145 being programmed to monitor user inputs and generating the authorization signal in response to, e.g., a user input that suggests that the playback of the media content has been compromised by a poor communication channel. An example user input may include frequently pausing playback of the media content. A user may pause media content playback to give the buffer 135 more time to fill and the decoder 130 more time to perform error correction techniques. Therefore, a user input that frequently pauses media content playback may suggest that the user has noticed glitches, especially if the decoder 130 has been addressing a large number of decoding errors. Alternatively, the user input may place the media content processing device 110 in a standby mode, which may be communicated to the access point 105. The access point 105 may begin to actively scan and determine the best overall channel based on signal quality until, e.g., another user input is received that brings the media content processing device 110 out of standby mode. By generating the authorization signal based on the buffer capacity being high, the number of decoding errors, or certain user inputs, the processing device 145 may command the access point 105 to change to a less congested communication channel or a communication channel with less noise or interference.

The processing device 145 may be programmed to command the communication interface 125 to transmit the authorization signal to the access point 105. As discussed above, in response to receiving the authorization signal, the access point 105 may select a new communication channel for streaming the media content signal.

Figure 3:
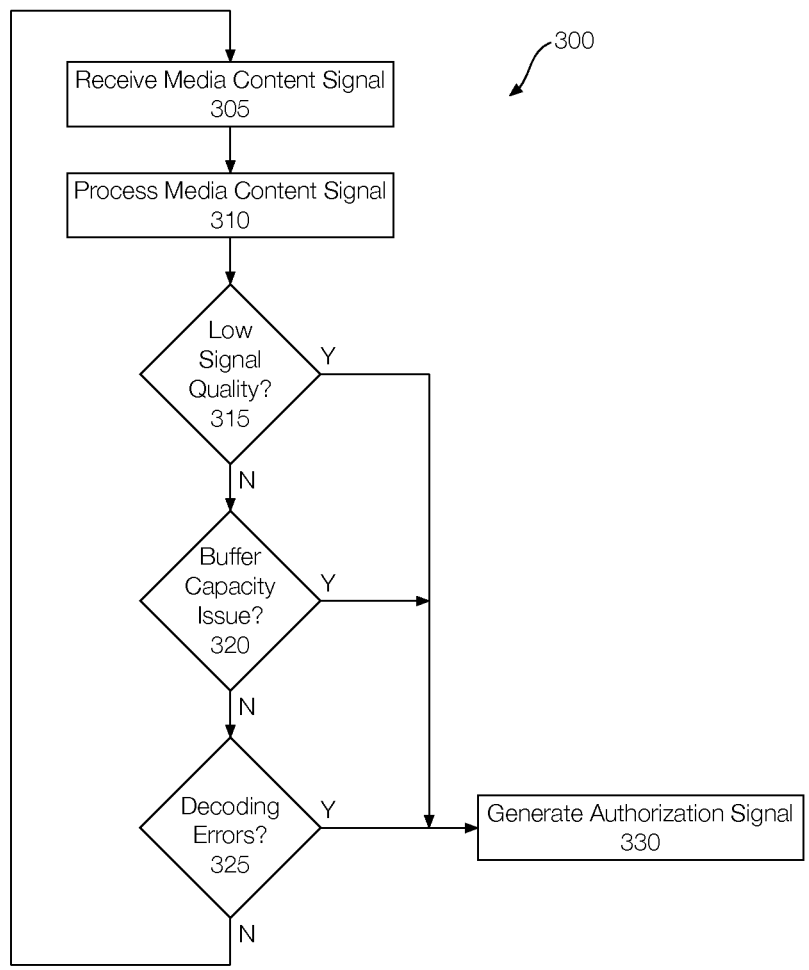
FIG. 3 is a flowchart of an example process that may be executed by one or more of the media content processing devices to authorize wireless communication over a different communication channel.

FIG. 3 is a flowchart of an example process 300 may be executed by one or more of the media content processing devices 110. The process 300 may be initiated any time the media content processing device 110 is powered on and is processing video and may continue to execute until the media content processing device 110 is turned off or enters a standby or sleep mode.

At block 305, the media content processing device 110 may receive a media content signal. The media content signal may be transmitted from the access point 105 over a first communication channel. The media content processing device 110 may receive the media content signal via, e.g., the communication interface 125.

At block 310, the media content processing device 110 may process the media content signal. The media content signal may be processed by the decoder 130, the processing device 145, or both. Processing the media content signal may include decoding the media content signal, applying error correction techniques, storing the media content signal in the buffer 135, accessing the media content signal from the buffer 135, outputting the media content for playback on an output device 115, etc.

At decision block 315, the media content processing device 110 may determine whether a characteristic, such as the quality, of the media content signal is or could cause a glitch in the playback of the media content. Examples of low signal quality may include low flow rate, excess jitter, error rate, increased latency, etc. If a low quality or other abnormal characteristic is detected, the process 300 may continue to block 330. Otherwise, the process 300 may continue to block 320.

At decision block 320, the media content processing device 110 may determine whether the buffer capacity suggests issues with the current communication channel. A buffer capacity that exceeds a predetermined level may indicate that the video data is accessed faster than it can be stored in the buffer 135, which may be a result of a poor communication channel. To the contrary, the buffer capacity exceeding another predetermined level may suggest an issue with the signal quality caused by, e.g., the decoder 130 needing extra time to apply error correction techniques to compensate for low quality signals. If the buffer capacity suggests a communication issue, the process 300 may proceed to block 330. Otherwise, the process 300 may continue at block 325.

At decision block 325, the media content processing device 110 may determine whether the media content signal has a large number of decoding errors that need to be addressed. Decoding errors may increase with the amount of traffic, interference, or noise on the communication channel. If a large number of decoding errors are required to process the media content signal, the process 300 may continue to block 330. Otherwise, the process 300 may return to block 305.

At block 330, the media content processing device 110 may generate the authorization signal. The authorization signal may be generated by, e.g., the processing device 145 and wirelessly transmitted to the access point 105 via the communication interface 125. The authorization signal, as discussed above, may command or permit the access point 105 to begin streaming the media signal over a different communication channel, e.g., a second communication channel. The second communication channel may be selected by, e.g., the access point 105 based on a scan and analysis of all available communication channels, historical data, or both.

The process 300 may continue to execute until the media content processing device 110 is turned off or enters a sleep or standby mode.

Figure 4:
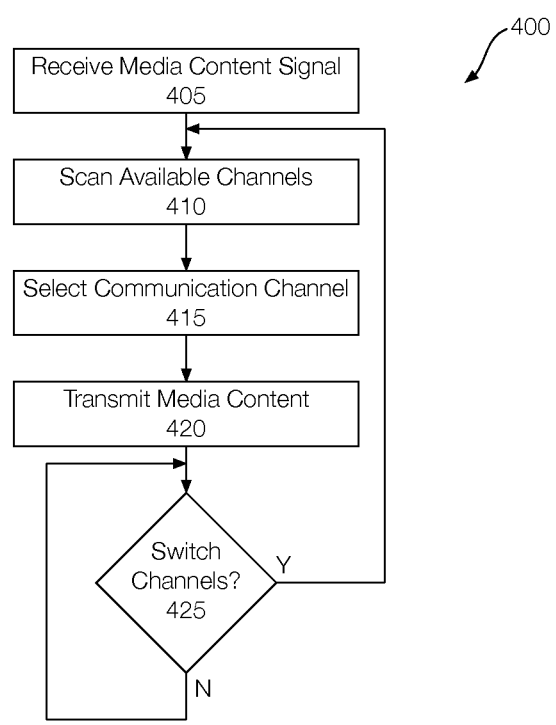
FIG. 4 is a flowchart of an example process that may be executed by the access point to transmit media content to media content processing devices over a different communication channel.

FIG. 4 is a flowchart of an example process 400 that may be executed by the access point 105 to transmit media content to media content processing devices 110 over a different communication channel. The process 400 may be initiated when the access point 105 is powered and may continue to execute until, e.g., the access point 105 is powered down or put into a sleep or standby state. In one possible implementation, the access point 105 may continue to scan for the best available channel even when placed in a sleep or standby state. Moreover, the access point 105 may collect historical data despite being in a sleep or standby state.

At block 405, the access point 105 may receive media content from a content provider. The media content may be received over a wired or wireless communication link.

At block 410, the access point 105 may scan available communication channels. By scanning the communication channels, the access point 105 may determine which channels have the least amount of congestion, interference, and noise.

At block 415, the access point 105 may select one of the communication channels to transmit the media content to the media content processing devices 110. The access point 105 may select the channel with the least amount of congestion, interference, and noise based on the scan performed at block 410. Moreover, the access point 105 may consider historical data representing how well signals are communicated to different media content processing devices 110 on each possible communication channel.

At block 420, the access point 105 may transmit media content over the selected communication channel. The selected media content may be transmitted to one or more of the media content processing devices 110. The media content signal may be streamed continuously to the media content processing device 110 until the media content processing device 110 requests different media content. The process 400 may proceed to block 425 once the access point 105 has begun streaming the media content signal.

At decision block 425, the access point 105 may determine whether to switch to a different communication channel for streaming the media content signal. For instance, the access point 105 may determine whether to switch to a different communication channel if an authorization signal from at least one of the media content processing devices 110 is received. In some instances, if the access point 105 determines that the signal quality on the current communication channel is poor, the access point 105 may still wait to switch to a new channel until the authorization signal is received. In implementations with multiple media content processing devices 110, the access point 105 may determine whether to switch communication channels based at least in part on whether a majority of the media content processing devices 110 have transmitted authorization signals. If the access point 105 decides to switch communication channels, the process 400 may return to block 410 so that the available communication channels may be scanned and a new communication channel, with less congestion, interference, or noise, selected. Otherwise, the process 400 may return to block 425.

The process 400 may continue to execute so long as the access point 105 is powered on. The process 400 may end if the access point 105 is powered down or enters a sleep or standby mode. Alternatively, as described above, the access point 105 may continue to scan for the best available channel even when placed in a sleep or standby state. Moreover, the access point 105 may collect historical data despite being in a sleep or standby state.

Further, while channel switching is generally described in the context of receiving the authorization signal, the access point 105 may switch channels for other reasons. For instance, channel switching may be permitted per underlying rules associated with one or more wireless communication standards, e.g., WiFi. Moreover, if the access point 105 encounters interference, it may change communication channels in accordance with the standard and possibly government regulations.

In general, the computing systems and/or devices described may employ any of a number of computer operating systems, including, but by no means limited to, versions and/or varieties of the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance. Examples of computing devices include, without limitation, a computer workstation, a server, a desktop, notebook, laptop, tablet, set-top box, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A media content processing device comprising:
a communication interface programmed to wirelessly communicate with an access point over a plurality of wireless communication channels including a first communication channel and a second communication channel and wherein the communication interface is programmed to receive a media content signal from the access point over the first communication channel; and
a processor in communication with the communication interface and programmed to process the media content signal and generate an authorization signal for the access point to transmit the media content signal over the second communication channel.

2. The media content processing device of claim 1, wherein the processor is programmed to generate the authorization signal in response to a change in a characteristic of the media content signal.

3. The media content processing device of claim 2, wherein the characteristic of the media content signal includes a quality of the media content signal.

4. The media content processing device of claim 3, wherein the quality of the media content signal includes at least one of flow rate, jitter, error rate, latency, and communication channel quality.

5. The media content processing device of claim 1, wherein the processor is programmed to temporarily store the media content signal in a buffer having a buffer capacity.

6. The media content processing device of claim 5, wherein the processor is programmed to generate the authorization signal in response to the buffer capacity indicating a problem with the first communication channel.

7. The media content processing device of claim 1, further comprising a decoder in communication with the communication interface and programmed to decode the media content signal.

8. The media content processing device of claim 7, wherein the processor is programmed to generate the authorization signal in response to a decoding error.

9. The media content processing device of claim 1, wherein the processor is programmed to generate the authorization signal in response to a user input.

10. A system comprising:
an access point programmed to wirelessly communicate over a plurality of communication channels including a first communication channel and a second communication channel and transmit a media content signal over the first communication channel; and
a media content processing device programmed to receive the media content signal from the access point over the first communication channel, process the media content signal, and generate an authorization signal,
wherein the access point is programmed to transmit the media content signal over the second communication channel in response to receiving the authorization signal.

11. The system of claim 10, wherein the media content processing device is programmed to generate the authorization signal in response to a change in a characteristic of the media content signal.

12. The system of claim 11, wherein the characteristic of the media content signal includes a quality of the media content signal.

13. The system of claim 11, wherein the access point is programmed to receive a second authorization signal from a networked device programmed to detect a change in a characteristic of the media content signal.

14. The system of claim 10, wherein the media content processing device is programmed to temporarily store the media content signal in a buffer having a buffer capacity, wherein the media content processing device is programmed to generate the authorization signal in response to the buffer capacity indicating a problem with the first communication channel.

15. The system of claim 10, wherein the media content processing device includes a decoder programmed to decode the media content signal, wherein the media content processing device is programmed to generate the authorization signal in response to a decoding error.

16. The system of claim 10, wherein the media content processing device is programmed to generate the authorization signal in response to a user input.

17. The system of claim 10, wherein the access point is programmed to scan the plurality of communication channels.

18. A system comprising:
an access point programmed to wirelessly communicate over a plurality of communication channels, including a first communication channel and a second communication channel, and transmit a plurality of media content signals over the first communication channel;
a plurality of media content processing devices, each programmed to receive one of the plurality of media content signals from the access point over the first communication channel, process the media content signal, and generate an authorization signal,
wherein the access point is programmed to transmit the plurality of media content signals over the second communication channel in response to receiving the authorization signal from at least one of the plurality of media content processing devices having a highest assigned priority or from a majority of the plurality of media content processing devices.

19. The system of claim 18, wherein the majority of the plurality of media content processing devices includes at least one media content processing device.

20. The system of claim 18, wherein each of the plurality of media content processing devices is programmed to generate the authorization signal in response to at least one of a change in a characteristic of at least one of the media content signals, a buffer capacity indicating a problem with the first communication channel, a decoding error, and a user input.

* * * * *